United States Patent
Cedilnik (10) Patent No.: US 10,466,116 B2
(45) Date of Patent: Nov. 5, 2019

(54) DISTRIBUTED SENSING CONSIDERING TWO RELATIONS BETWEEN MEASUREMENT SIGNALS

(71) Applicant: AiQ DIENSTLEISTUNGEN UG (haftungsbeschränkt), Böblingen (DE)

(72) Inventor: Gregor Cedilnik, Gäufelden (DE)

(73) Assignee: AIQ Dienstleistungen UG (Haftungsbeschrankt), Böblingen (DE)

( * ) Notice: Subject to any disclaimer, the term of this patent is extended or adjusted under 35 U.S.C. 154(b) by 692 days.

(21) Appl. No.: 15/170,483

(22) Filed: Jun. 1, 2016

(65) Prior Publication Data

US 2016/0349120 A1   Dec. 1, 2016

(30) Foreign Application Priority Data

Jun. 1, 2015   (DE) .................. 10 2015 108 634

(51) Int. Cl.
  *G01K 11/32*   (2006.01)
  *G01D 5/353*   (2006.01)

(52) U.S. Cl.
  CPC .......... *G01K 11/32* (2013.01); *G01D 5/35364* (2013.01); *G01K 2011/322* (2013.01); *G01K 2011/324* (2013.01)

(58) Field of Classification Search
  CPC ........................ G01K 11/32; G01D 5/35364
  See application file for complete search history.

(56) References Cited

U.S. PATENT DOCUMENTS

2015/0233767 A1   8/2015   Cedilnik et al.
2015/0330844 A1*  11/2015  Oishi ................. G01M 11/3109
                                                 356/73.1

FOREIGN PATENT DOCUMENTS

| DE | 10 2015 102 309 A1 | 8/2015 |
| EP | 2 966 426 A1 | 1/2016 |
| GB | 2234346 A | 1/1991 |
| GB | 2523319 A | 8/2015 |
| JP | 2006-23260 | 1/2006 |

OTHER PUBLICATIONS

Combined Search and Examination Report for Application issued in parallel application GB1609570.5; dated Dec. 15, 2016; 6 pages.

* cited by examiner

*Primary Examiner* — Maurice C Smith
(74) *Attorney, Agent, or Firm* — Lewis Roca Rothgerber Chrisite LLP (57) ABSTRACT

A distributed sensing device for determining a physical quantity, the device comprising a measuring unit configured for measuring at least two signals correlated to the physical quantity by distributed sensing, and a determining unit configured for bringing the at least two signals into a first relation used to determine the physical quantity, performing a correction based on a second relation between the at least two signals, and determining the physical quantity based on the first relation under consideration of the correction.

23 Claims, 4 Drawing Sheets

DISTRIBUTED SENSING CONSIDERING TWO RELATIONS BETWEEN MEASUREMENT SIGNALS

RELATED APPLICATIONS

This application claims the benefit of the filing date of German Patent Application No. 10 2015 108 634.4 filed 1 Jun. 2015, the disclosure of which is hereby incorporated herein by reference.

TECHNICAL FIELD

The invention relates to a distributed sensing device, to a method of determining a physical quantity by distributed sensing, to a program element, and to a computer-readable medium.

TECHNICAL BACKGROUND

Distributed temperature sensing (DTS) devices are optoelectronic devices which measure temperature by optical fibers functioning as linear sensors. Temperature values are recorded along the optical sensor cable as a continuous profile. A high accuracy of temperature determination is achieved over long distances. Measurement distances of several kilometers can be achieved. The temperature dependence of the Raman effect can be used for a DTS measurement.

In Raman-DTS, the Stokes and Antistokes backscatter from a medium (like an optical fiber) are both measured. They differ in wavelength so that suitable filters separate both. They may be measured for instance by two detectors (one for the Stokes signal and one for the Antistokes signal) or one detector in a sequence (where the detector is switched either to the Stokes signal or to the Antistokes signal). The temperature is then calculated from their ratio. The Antistokes data and the Stokes data have different relative sensitivities (i.e. the relative change per degree Celsius temperature change) so that the ratio also bears the temperature information. The ratio operating has the advantage that losses of Stokes and Antistokes in the path cancel out (at least as far as it is the same for both), for instance connector losses or by attenuation in the fiber over distance. Remaining differences (that do not cancel out) can be compensated to some degree by different methods like dual-ended measurement (measuring the same medium from opposite directions), measurement with two different incident wavelength of suitable wavelength difference and using for example Stokes from the one wavelength and Antistokes from the other wavelength, or by supplying information about loss differences between Stokes and Antistokes medium (for instance by a number in dB/km).

Both, Stokes and Antistokes data from the measurement bear some noise for instance from a photodetector (for instance thermal noise or shot noise) and the following electronics and digitizer. A drawback of the ratio calculation is that both, the noise in Stokes as well as the noise in Antistokes contribute to the noise in the ratio data. From statistics it follows that in combination they lead to higher noise in the ratio data than would be in the ideal or hypothetic case that any of them would be noise-free.

As noise limits accuracy of distributed sensing, it is generally desired to reduce it. Moreover, noise and other distortions in the measurement data of a distributed sensing device may result in an inaccuracy of the physical quantity to be determined.

There may be a need to enable determining a physical quantity by distributed sensing with high accuracy.

SUMMARY OF THE INVENTION

According to exemplary embodiments, a distributed sensing device, a method of determining a physical quantity by distributed sensing, a program element, and a computer-readable medium according to the independent claims are provided.

According to an exemplary embodiment of the invention, a distributed sensing device for determining a physical quantity (in particular the value of a physical parameter; for instance, the physical parameter may be the temperature and the physical quantity may be a temperature value) is determined, wherein the device comprises a measuring unit configured for measuring at least two signals correlated to the physical quantity by distributed sensing, and a determining unit configured for bringing the at least two signals into a first relation used to determine the physical quantity, performing a correction based on a second relation (in particular differing from the first relation) between the at least two signals, and determining the physical quantity based on the first relation under consideration of the correction.

According to another exemplary embodiment of the invention, a method of determining a physical quantity by distributed sensing is provided, wherein the method comprises measuring at least two signals correlated to the physical quantity by distributed sensing, bringing the at least two signals into a first relation used to determine the physical quantity, performing a correction based on a second relation between the at least two signals, and determining the physical quantity based on the first relation under consideration of the correction.

According to still another exemplary embodiment of the invention, a program element (for instance a software routine, in source code or in executable code) is provided, which, when being executed by a processor (such as a microprocessor or a CPU), is adapted to control or carry out a method having the above mentioned features.

According to yet another exemplary embodiment of the invention, a computer-readable medium (for instance a CD, a DVD, a USB stick, a floppy disk, a harddisk, or a cloud storage device) is provided, in which a computer program is stored which, when being executed by a processor (such as a microprocessor or a CPU), is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

The term "fiber" may particularly denote a member (in particular an optoelectronic member) capable of guiding electromagnetic radiation to propagate along a defined path through the fiber. A fiber made for instance of fused silica glass may be capable for transporting visible and infrared radiation. Hence, a fiber may be denoted as a dielectric waveguide at least partially transparent for electromagnetic radiation.

The term "electromagnetic radiation" may particularly denote photons of a suitable wavelength capable of propagating through a fiber. Optical radiation may be in a range between 400 nm and 800 nm, i.e. may be in the visible region. Infrared radiation usable for partial discharge detection may be in a range between 800 nm and 5000 nm. For instance, 1550 nm is a suitable measurement wavelength. Particularly appropriate wavelengths for distributed sensing are in a range between 850 nm and 1700 nm.

In the context of the present application, the term "distributed sensing" may particularly denote a continuous distributed measurement along the length of a sensing fiber. For instance, light backscattered from the fiber may be used to deliver strain data and/or temperature data. In particular, a physical quantity may be determined in a distributed way over an extended physical domain (such as space) by distributed sensing. A distributed sensing device may use electromagnetic radiation as a probe for sensing a distribution of the physical quantity along the physical domain, in particular along a fiber in which the electromagnetic radiation propagates and is scattered. Thus, the mentioned distributed sensing device may comprise an electromagnetic radiation source configured for generating primary electromagnetic radiation coupled into the fiber, and may comprise an electromagnetic radiation detector configured to detect secondary electromagnetic radiation generated in response to the coupling of the primary electromagnetic radiation into the fiber.

In the context of the present application, the term "signals" may particularly denote measurement data detected by an electromagnetic radiation detector of the distributed sensing device (like optical intensity, optical frequency and/or frequency shift relative to incident radiation (Brillouin scattering has a small bandwidth, and here not only the amplitude, but also the frequency or the frequency shift changes with the temperature and/or strain, in the Stokes signal as well as in the Antistokes signal)), wherein the individual signals may relate to different portions of the detected data. Such different portions may be portions of the detected data which relate to different wavelengths or wavelength ranges of detected electromagnetic radiation. In terms of distributed sensing, these two signals may relate to a wavelength section of detected secondary electromagnetic radiation which has an increased wavelength and another wavelength section which has a decreased wavelength as compared to the (in particular monochromatic) primary electromagnetic radiation coupled into the fiber. A decreased wavelength may result from phonon annihilation (Antistokes process) within the fiber, whereas an increased wavelength may relate to a phonon creation (Stokes process).

The term "relation" between signals may correspond to a mathematical, computational or logical operation or any other relationship by which the two or more signals are combined. For instance, a ratio between Stokes signal and Antistokes signal (i.e. a first relation) is indicative of a temperature. Another second relation between the two or more signals may relate to a weighted (in particular normalized) difference between these signals.

The term "target value" may particularly denote an ideal value of the second relation under the assumption of ideal (i.e. undistorted, for instance noise-free) signals. The target value may be predetermined (at least approximately) from a theoretical or empirical model or may be determined (at least approximately) from measurement signals acquired at different points of time and/or for different spatial positions. For distorted (for instance noisy) signals, the value of the second relation may deviate from the target value due to the presence of the distortion (for instance noise).

Exemplary embodiments are based on the consideration that accuracy of a distributed sensing measurement can be significantly improved by not only considering a first relation between measurement signals for determining the physical quantity but by additionally considering another second relation between these measurement signals to extract, for correction purposes, additional information which may get lost when calculating the first relation. As an example, when calculating a ratio between two measurement signals as the first relation, the procedure of calculating this ratio involves a mathematical loss of information about the individual noise of a respective one of the measurement signals. A corresponding inaccuracy may be reduced by considering another second relation between the measurement signals to thereby suppress distortions (such as noise) of the measurement signals as well. This improves the overall precision of the determined physical quantity.

Hence, an exemplary embodiment provides a distributed sensing device for determining a physical quantity (for instance temperature), wherein two or more signals correlated to the quantity to be determined and/or to each other (for instance Stokes signal and Antistokes signal) are measured and brought into a specific relation (for instance ratio) that is used to calculate the physical quantity. At least one of the signals may be corrected based on another relation between the two or more measured signals (for instance their fit/misfit into a model). More generally, the correction may be performed based on the signals and/or the physical quantity to be determined and/or an intermediate quantity in a calculation chain (like ratio).

More specifically, an exemplary embodiment of the invention carries out a signal correction (in particular a correction of the Stokes and Antistokes signals) for improving accuracy of determining a physical quantity such as a temperature by distributed sensing. A cognition of an embodiment of the present invention is that a first relation (in particular a ratio) between measurement signals, which is used for determining the physical quantity, carries less information than the original measurement signals (in particular a set of Stokes and Antistokes signals or data). An embodiment of the invention retrieves and uses information that conventionally gets lost to improve the signal to noise ratio. More generally, this may allow to detect and/or correct disturbances within the measurement signals (in particular Stokes and Antistokes signals or data). For this purpose, a correction of the measurement signals (in particular of the Stokes signal and/or of the Antistokes signal) or a physical quantity or intermediate information derived therefrom) can be made based on a second relation between the signals (in particular a weighted, in particular normalized, difference between the Stokes signal and the Antistokes signal), which differs from the first relation. This allows to more comprehensively or even fully use the information contained in the measurement signals.

In the following, further exemplary embodiments of the device, the method, the program element, and the computer-readable medium will be explained.

In an embodiment, the at least two signals comprise a Stokes signal and an Antistokes signal measured by the measuring unit as secondary electromagnetic radiation generated in a fiber of the distributed sensing device in response to coupling primary electromagnetic radiation into the fiber. Since the Stokes signal and the Antistokes signal may have different signal-to-noise ratios (more generally, different noise characteristics) and/or sensitivities to the physical quantity to be determined, consideration of a second relation between these two signals, i.e. different noise characteristics and/or sensitivities to the physical quantity to be determined, in addition to a first relation (such as a ratio between the two signals) may improve the accuracy of the determination of the physical quantity. The reason for this improvement of the accuracy is that different individual noise characteristics can be lost by determining a physical quantity such as temperature by calculating a ratio between these two signals.

In an embodiment, the first relation depends on a ratio, in particular a logarithmic ratio, between the at least two signals. In distributed sensing, calculating a (in particular logarithmic) ratio of two signals such as Stokes and Antistokes signal is performed for determining information concerning a physical quantity such as temperature.

In an embodiment, the second relation may be a relation (for instance a noise related relation) configured for retrieving noise information which is not derivable from the first relation between the signals. In other words, the second relation may be capable of retrieving noise information from the individual signals which is not derivable from the first relation.

In an embodiment, the second relation is indicative of a deviation of the at least two signals (as measured) from a predetermined target value. In other words, when distorted (for instance noisy) signals are applied to the second relation, the result deviates from the predetermined target value which indicates the result of applying ideal undistorted signals to the second relation. In particular, application of the second relation to the measured signals provides information as to whether at least one of the at least two signals fits or does not fit into a predefined model. The second relation may also be indicative of a degree (for instance in percent) to which a respective one of the signals fits into the predefined model. A respective one of the signals which does not fit or which does not fit to a sufficient degree to the model may then be made subject of a correction.

In an embodiment, the determining unit is configured for performing the correction by individually correcting the at least two signals so that an absolute value of a difference between a predetermined target value and the second relation calculated for the measured signals is larger than an absolute value of the difference between the predetermined target value and the second relation calculated for the corrected signals. More particularly, the correction may be carried out so that the second relation calculated for the corrected signals is equal to the predetermined target value. As will be described below in further detail, the determination of the target value can be performed for example based on an averaging procedure using the measured signals (related to different points in space and/or to different points in time) and the second relation, or based on a theoretical model or an empirical model.

In an embodiment, the second relation is or relates to a normalized difference between the at least two signals (see equation (4) below). The normalized difference may be calculated based on the term $\chi/\chi_S * S - \chi/\chi_{AS} * AS$, where S is the Stokes signal and AS is the Antistokes signal, $\chi/\chi_S$ and $\chi/\chi_{AS}$ are individual factors for the Stokes signal and the Antistokes signal, respectively, and $\chi$ is a scaling factor (which may be indicative of the signal level due to signal attenuation along the fiber). This will be described in the following in further detail:

According to the Raman theory, S and AS strengths respond to temperature T in a correlated way, more specifically by the Planck function P(T):

$$AS(T) = \chi_{AS} * P(T) \quad (1a)$$

$$S(T) = \chi_S * (1 + P(T)) \quad (1b)$$

$$P(T) = 1/(e^{\hbar\Omega/k_B T} - 1) \quad (1c)$$

wherein $\hbar$ is the Planck constant ($1.0546 \cdot 10^{-34}$ Js), $\Omega$ is the optical frequency (of involved phonons, for example approximately 13 THz), and $k_B$ is the Boltzmann constant ($1.3807 \cdot 10^{-23}$ J/K).

In a real measurement, the S signal is usually stronger and responds relatively less to a temperature change than the AS signal. The different relative sensitivities can be easily seen in a logarithmic or dB representation, wherein in linear representation the temperature response is the same.

Equations (1a) to (1c) indicate towards which target relation the measured S and AS may be corrected: if both quantities are normalized to $\chi=1$ (i.e. AS is divided by $\chi_{AS}$ and A is divided by $\chi_S$ leading to reduced signals $S_0$ and $AS_0$), equations (1a) to (1c) give:

$$S_0(T) - AS_0(T) = 1 \quad (2)$$

i.e. the difference does not depend on T. Any deviation from 1 can therefore be considered to occur due to noise and/or any other contribution (for instance distortion) not related to the physical quantity to be determined. S and AS may then be corrected towards this target relation before calculating their ratio for deriving the temperature.

Practically, factors $\chi_{AS}$, $\chi_S$ can depend (at least mainly) on the wavelength, fiber, pulse laser power and the instrument sensitivity to respective wavelength. In optical fibers it also depends on the losses along the fiber, thus becomes depending on the distance, x, within the fiber. In DTS, the two scaling factors $\chi_{AS}(x)$ and $\chi_S(x)$ can be normalized to one common scaling factor $\chi(x)$, based for instance on measurement in a fiber reference section of known temperature and/or derived from a user supplied quantity like fiber differential loss and/or by methods like dual-laser and/or double-ended measurement and/or from factory calibration data:

$$AS_{norm}(T) = \chi/\chi_{AS} * AS_{meas}(T) \quad (3a)$$

$$S_{norm}(T) = \chi/\chi_S * S_{meas}(T) \quad (3b)$$

In equations (3a) and (3b), "norm" indicates normalized signals, whereas "meas" indicates measured signals. In a ratio calculation, $\chi(x)$ cancels out together with equations (1a) to (1c) so that there is no impact on the determined temperature (as it should be).

According to an exemplary embodiment of the invention, the difference is then not 1, but $\chi$ (with dependence on distance x, but still not depending on the temperature T):

$$S_{norm}(T) - AS_{norm}(T) = \chi \quad (4)$$

Equation (4) and indicates an example of a second relation between the signals, more precisely a normalized difference between the signals. The consideration of this second relation as well provides additional information compared to the first relation (in particular ratio between the signals) alone. The scaling factor or target relation trace $\chi(x)$ may practically be determined from the measurement data itself in an initial measurement of sufficiently long measurement time (so that the noise is averaged out). It may also be determined live or during the measurement by averaging that difference over some meters distance before and after each position x (again to average-out noise, assuming that fiber property and/or signal amplitude do not change significantly within a short range) or by averaging over each position over some time (assuming the target relation does not change significantly over time).

In an embodiment, the physical quantity is a temperature and/or a strain, in particular a temperature distribution and/or a strain distribution along a fiber of the distributed sensing device. In distributed temperature sensing (DTS), the temperature or temperature distribution along a long fiber can be measured precisely. However, other exemplary embodiments are also capable of measuring other physical quantities, for instance vibration or mechanical strain at a certain position of the fiber.

In an embodiment, the determining unit is configured for performing the correction by correcting at least one of the at least two signals, and/or the physical quantity to be determined, and/or an intermediate quantity determined in a determination chain of determining the physical quantity based on the at least two signals. Thus, in one alternative, the correction is applied to the signal(s) itself so that a precision of the respective signal(s) may be improved by the signal correction. However, additionally or alternatively, the correction may be carried out at the finally determined parameter, i.e. the physical quantity (for instance a correction of the derived temperature value may be made considering additional information from the second relation). For instance, the uncorrected signals may be processed as such for calculating the physical quantity, and the determined incorrectness can be compensated by correcting not or not only the signal(s), but in contrast to this the value for the physical quantity. As a further option, the correction may also be applied to an intermediate quantity which is calculated as an intermediate result when deriving the physical quantity from the measured signals, for example on the ratio. In other words, a correction may be performed at one or more stages during the entire processing chain.

In an embodiment, the determining unit is configured for performing the correction based on a predefined model, in particular a physical model. In this context, it is possible to predetermine the target value, which is in accordance with the second relation when having performed the correction, based on such a model. This model can be capable of modeling the characteristics of the distributed sensing system and the physical effects occurring therein when electromagnetic radiation propagates along the fiber and interacts with physical events (such as a local temperature peak or a local vibration) during this propagation, which has, in turn, an impact on the detected signals. In particular, it is possible to model the physical effects occurring within a fiber of such a distributed sensing device. Boundary conditions of such a model may be physical laws considered when evaluating the signals, in particular in terms of the second relation.

In an embodiment, the predefined model may comprise a Raman scattering model assuming a Planck distribution and/or an empirical scattering model. The Stokes signal and the Antistokes signal may hence be corrected towards a relation described by a model. This approach may be based on a theoretical or ideal Raman scattering model assuming a Planck distribution, may be based on a user-modified Raman scattering model, or may be an empirically determined model. Thus, it may be assumed that the primary electromagnetic radiation coupled into the fiber is subject to the Planck law. A user-modified Raman model may use Raman theory as a basis but may additionally consider one or more user-defined phenomena such as plug losses and/or fiber loss spectra (i.e. may at least partially compensate for losses due to the phenomenon that the fiber attenuates differently at different wavelengths which results in a deformation in the spectrum comprising Stokes and Antistokes signal). As an alternative, also other empirical or theoretic models may be applied. In particular, it is possible to use, for this purpose, a Brillouin scattering model, in particular a user-modified Brillouin model.

In an embodiment, the determining unit is configured for performing the correction (in particular towards or based on the model) with different weights for the at least two signals, in particular depending on their respective signal-to-noise ratio. A correction (in particular towards the model) may hence be done with different weights for the Stokes signal and the Antistokes signal. Differently weighting the individual signals may allow to consider individual differences, for instance individually different distortions or noise levels of the signals, or different sensitivity of the signals to the quantity to be determined. This may allow to recover additional information for improving the accuracy of determining the physical quantity in particular in a scenario in which the additional information is lost by applying the first relation to the signals.

In an embodiment, the determining unit is configured for performing the correction by assigning the different weights to the corrections for instance of the at least two signals so that one of the signals having a smaller noise than another one of these signals is corrected less than the other one of the signals. In other words, the higher (or lower) a reliability of a signal is, the lower (or higher) may be its weighting coefficient. This increases the reliability and reduces the uncertainty of the overall results of the evaluation of the signals and hence improves the accuracy of the physical quantity. The above-mentioned correction towards the model may be done with different weights for the Stokes signal and the Antistokes signal, for instance depending on their respective signal-to-noise ratio. In particular, it is possible to correct less the signal with better signal-to-noise ratio as the mismatch to the model is more probably caused by the signal with worse signal-to-noise ratio (for example in FIG. 4, the correction is the same for the Stokes signal and the Antistokes signal in dB units, whereas in linear units the correction is much more in the Stokes signal where a DTS measurement may have more noise). By applying another weighting coefficient to a signal having a smaller noise than another signal having a larger noise, the accuracy of the determination of the physical quantity is increased by reflecting the fact that the information included in the less noisy signal is more reliable than the information contained in the more noisy signal.

In an embodiment, the determining unit is configured for performing the correction by assigning the weights being independent of the physical quantity (such as temperature) to be determined. That relation may be a difference of normalized signals $\chi/\chi_S*S-\chi/\chi_{AS}*AS$, which does not depend on temperature. For example, the weighting may be advantageously performed independently of the temperature to be determined, in contrast to this for instance depending on a spatial position, x, along the fiber only ($\chi=\chi(x)$). Therefore, the correcting weight factors may be independent of the physical parameter and corresponding physical quantity to be actually determined.

In an embodiment, the determining unit is configured for determining a target value, which is in accordance with the second relation when having performed the correction, by averaging, over space, values derived from the second relation applied to the at least two signals. The target value may be empirically determined from measurement data (using the second relation), averaged over space (preferably over a sliding spatial range where that relation does not significantly change), in particular done at each time of measurement. Averaging over space is particularly advantageous since this reduces noise in that empirically determined relation.

In an embodiment, the determining unit is configured for determining a target value, which is in accordance with the second relation when having performed the correction, by averaging, over time, values derived from the second relation applied to the at least two signals. The target value may hence be empirically determined from the measured data (using the second relation) averaged over time, preferably over a temporal range where that relation does not significantly change (in particular for each point). This can be understood as a sliding average or a one-time initial long-time measurement.

The above-described procedures (i.e. averaging over time and averaging over space) may also be combined or mixed (allowing to reduce the sliding range, and thus the second relation can change faster over position, for instance at a transition to different fiber types, and faster over time, for instance if the fiber loss and/or connector loss and thus laser power change). It may hence be preferred that the averaging is performed over both space and time to allow to react faster on changes.

In an embodiment, the determining unit is configured for selectively limiting the averaging to at least one section, in particular to at least one section in space or in time, in which a condition (such as an event or a property) influencing the second relation is free of significant changes, in particular discontinuities. A corresponding decision rule may be as follows: Do not average over such a discontinuity or distortion, but still do a correction (towards a value that might not be averaged as much and thus effectively this correction is less than elsewhere or zero). Thus, the determining unit may be configured for selectively avoiding averaging over at least one section (in particular in at least one section in space (such as a spatial section of the fiber in which the fiber properties change, for instance a discontinuity occurs) and/or in time (such as a temporal section of the measurement in which the measurement properties change, for instance a discontinuity occurs)) in which carrying out the averaging might result in a reduction of the accuracy of the determined physical quantity when the averaging includes a part on one side of the discontinuity and another part on an opposing side of the change, for instance discontinuity. More particularly, the determining unit may be configured for only temporally and/or locally avoiding the averaging depending on a temporal and/or local event or condition. The averaging may be temporally and/or locally deactivated or modified, depending on certain conditions (such as detected events) in the measured quantity (like identified setup- or sensor changes over time and/or location). For instance, it is possible to identify one or more locations of connectors or fiber-type change (for instance loss steps) and to deactivate or modify the averaging there (in particular locally) and/or exclude that location or adjacent region from determining the reference relation. Otherwise averaging over such transitions may lead to a target value which neither fits to the fiber before nor behind the transition and the correction could even falsify the temperature around this transition. In certain events or circumstances, the described procedure involves artefacts and may therefore deteriorate accuracy of the determined physical quantity. This may for instance occur when the fiber is composed of two connected fiber portions with different physical characteristics. At the interface between these two fibers, the correction may involve an additional corrective contribution which does not have anything to do with the physical quantity but simply with the fact that the two fibers are connected. Therefore, the correction may be omitted specifically at this interface, or, more preferable, the averaging may be limited to a spatial and/or temperament range within which there is no discontinuity (in particular in terms of fiber material, electromagnetic radiation intensity, etc.). The calculation of multiple values for the second relation for determining the target value may hence be limited to either side of the transition. In a corresponding way, changes of the electromagnetic radiation coupled into the fiber over time (for instance when changing a control current or a control voltage for powering an electromagnetic radiation source) may also involve artefacts for a certain time interval. Therefore, also in such an event, the correction may be interrupted temporarily or the calculation of the target value may be limited to either before or after that change.

In an embodiment, the at least two signals are correlated to one another. This has the advantage that the signals (for instance Stokes signal and Antistokes signal) are dependent from one another and are therefore the source of mutually meaningful information.

In an embodiment, the determining unit is configured for performing the correction by shifting the at least two signals (more precisely point by point, i.e. separately for each position) relative to one another. This shifting may be done by an arithmetic operation like addition or multiplication with a value. Preferably, the shifting may be performed so that a match of the shifted at least two signals with regard to a model is improved compared to a match of the at least two signals with regard to the model without the shifting. For example, the corrective shifting may be terminated when the best match has been found or when a match with a quality above a predefined threshold quality value has been found.

In an embodiment, the determining unit is configured for determining a first preliminary physical quantity based on only one of the at least two signals (for instance only based on the Stokes signal), determining a second preliminary physical quantity based on only another one of the at least two signals (for instance only based on the Antistokes signal), performing the correction by applying the second relation to the first preliminary physical quantity and the second preliminary physical quantity (for instance calculating a difference between the first preliminary physical quantity and the second preliminary physical quantity to obtain a value which can be used for the correction), and determining the physical quantity by applying the first relation to the first preliminary physical quantity (which is derived from the one signal) and the second preliminary physical quantity (which is derived from the other signal) under consideration of the correction (for instance calculating a weighted average value of the first preliminary physical quantity and the second preliminary physical quantity, wherein a weighting factor may correspond to the correction).

Hence, the correction can effectively be realized via the described calculation, e.g. by deriving the physical quantity from each of the at least two signals alone (e.g. from the Stokes signal alone and from the Antistokes signal alone with appropriate methods, for instance by consideration of fiber damping, distributed sensing measurements from both opposing sides of the fiber, etc.) and then combining both physical quantity results by a defined function, where "combining" corresponds to the previously described "correction" and "defined function" is a mathematical alternative to the previously described correction towards a "target value".

Figure 2:
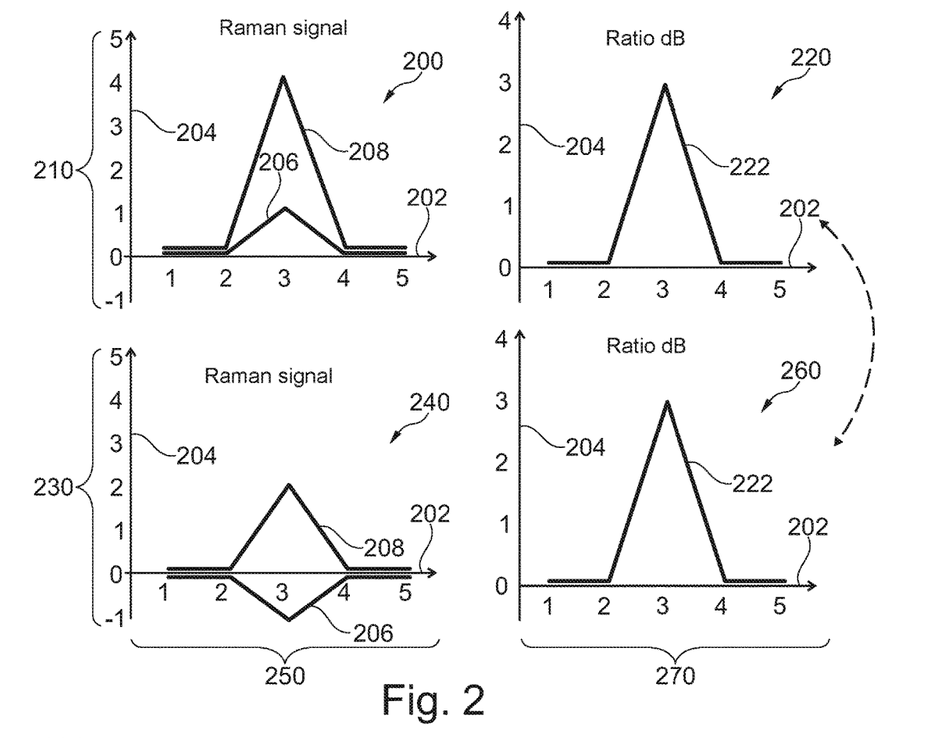
FIG. 2 illustrates diagrams showing, for a real and ideally measured hotspot at a fiber in a top row and for a noise artifact in a bottom row, a Stokes signal and an Antistokes signal individually in a left column and a ratio between the Stokes signal and the Antistokes signal in a right column.

For instance referring to bottom row 230 in the FIG. 2, determining the temperature only from the Stokes signal (which, also alone, depends on the Planck equation) or from the Antistokes signal (which, also alone, depends on the Planck equation) would already reduce (in case of the Antistokes signal) the apparent hotspot compared to a conventional calculation, or may even change the sign thereof (in case of the Stokes signal). By combining these two temperature values by a function (for instance by averaging), the hotspot is further reduced, i.e. is approached towards the realistic or real value.

In an embodiment, the device is configured as a Distributed Temperature Sensing (DTS) device or a Distributed Temperature and Strain Sensing (DTSS) device. With DTS it is possible to determine a temperature or a temperature distribution along the fiber. A DTSS device is an electrooptical instrument which responds to temperature and strain along the fiber.

The analysis of the second relation between the measurement signals and a corresponding correction may involve an analysis of a Stokes signal and an Antistokes signal in a diagrammatic illustration (in particular in a semilogarithmic diagram) in which the physical quantity (for a certain point in space/for a certain point in time) is plotted along an abscissa and the (for instance logarithmic) intensity of the respective signal is plotted along an ordinate. In such a diagram, the approximation of the second relation to a predetermined target value may correspond to and the correction may be carried out by a vertical shifting of the Stokes signal and the Antistokes signal relative to one another. The shifting may be kept as small as possible, but as large as necessary to improve the accuracy of the determined temperature result. The larger the noise of a respective signal, the larger may be the individual shifting range of this signal, and vice versa. This is based on the cognition that the more reliable a signal is, the weaker should be the manipulation of the signal in terms of the correction. For instance referring to FIG. 4, the described correction can be performed point by point in space or time.

A determination method, considering both a first relation and a second relation between signals, according to an exemplary embodiment of the invention may involve the following procedures:

A value $\chi$ can be estimated, which represents a temperature-independent and spatially dependent (in particular normalized) difference between the (normalized) Stokes signal and the (normalized) Antistokes signal (as the second relation). The value of $\chi$ is indicative of the signal decrease with the distance along the fiber, for example by fiber attenuation (in the ideal case of averaging over an infinity temporal range, an ideal noise-free value of $\chi$ could be approximated). For determining this value $\chi$, the detector signal of the Stokes signal and the Antistokes signal (for instance of one pulse of electromagnetic radiation coupled into the fiber) is detected as a function of time and/or space (based on time-of-flight). The difference between the two respective curves is calculated. Ideally, this difference is constant, but due to fiber damping it can be modeled with a falling exponential function over distance. The result is independent of temperature. The mentioned difference still contains noise. By a spatially averaging, an approximately ideal or target value for each fixed fiber position is obtained, which corresponds to the value $\chi$.

As a next procedure, the Stokes signal and the Antistokes signal are individually shifted (and thereby corrected) in such a way that the distance (i.e. its difference, which then corresponds to the second relation) equals to the estimated target value $\chi$. This can be done point by point.

The estimation as to how strong the Stokes signal and the Antistokes signal are shifted depends on the noise of the respective signal. In particular, the shift may be larger, the higher the noise of the respective signal is, and vice versa. This is a part of the correction.

Now the ratio (as the first relation) between the corrected values of the Stokes signal and the Antistokes signal may be calculated, and this provides the desired physical quantity (in particular the temperature via Boltzmann relation) with statistically less noise involved.

In a nutshell, the described procedure brings the Stokes signal and the Antistokes signal into a shape from which the correct temperature may be determined with higher precision.

According to an exemplary embodiment of the invention, a physical quantity determining system is provided which allows to extract additional information from a Stokes signal and an Antistokes signal to improve the temperature resolution in DTS. Real tests have shown a significant improvement of the temperature resolution, for instance by 2 dB. This can be achieved with a moderate calculation effort by using a simple arithmetic modification along traces (i.e. data sets along the fiber). In particular, the involved computational burden is small in view of the fact that complex transformations, convolutions and/or correlations are dispensable.

In one embodiment, an additional trace memory can be implemented (for instance determining the target value by temporal and/or spatial averaging). In another embodiment, this can be omitted.

One exemplary field of application of exemplary embodiments of the invention is Raman-OTDR where two wavelengths carry the information (or more generally at least two correlated quantities are measured). In particular, also OFDR (Optical Frequency Domain Reflectometry) is a possible field of application. Exemplary embodiments of the invention can be implemented using a single-ended architecture, a double-ended architecture, a dual-laser architecture, etc. Embodiments of the invention also applicable to B-OTDR (Brillouin Optical Time Domain Reflectometry) that measures two or more correlated quantities like Stokes and Antistokes frequency shifts or their amplitudes.

The aspects defined above and further aspects of the invention are apparent from the examples of embodiment to be described hereinafter and are explained with reference to these examples of embodiment.

DETAILED DESCRIPTION OF EXEMPLARY EMBODIMENTS

The invention will be described in more detail hereinafter with reference to examples of embodiment but to which the invention is not limited.

The illustration in the drawing is schematically. In different drawings, similar or identical elements are provided with the same reference signs.

Figure 1:
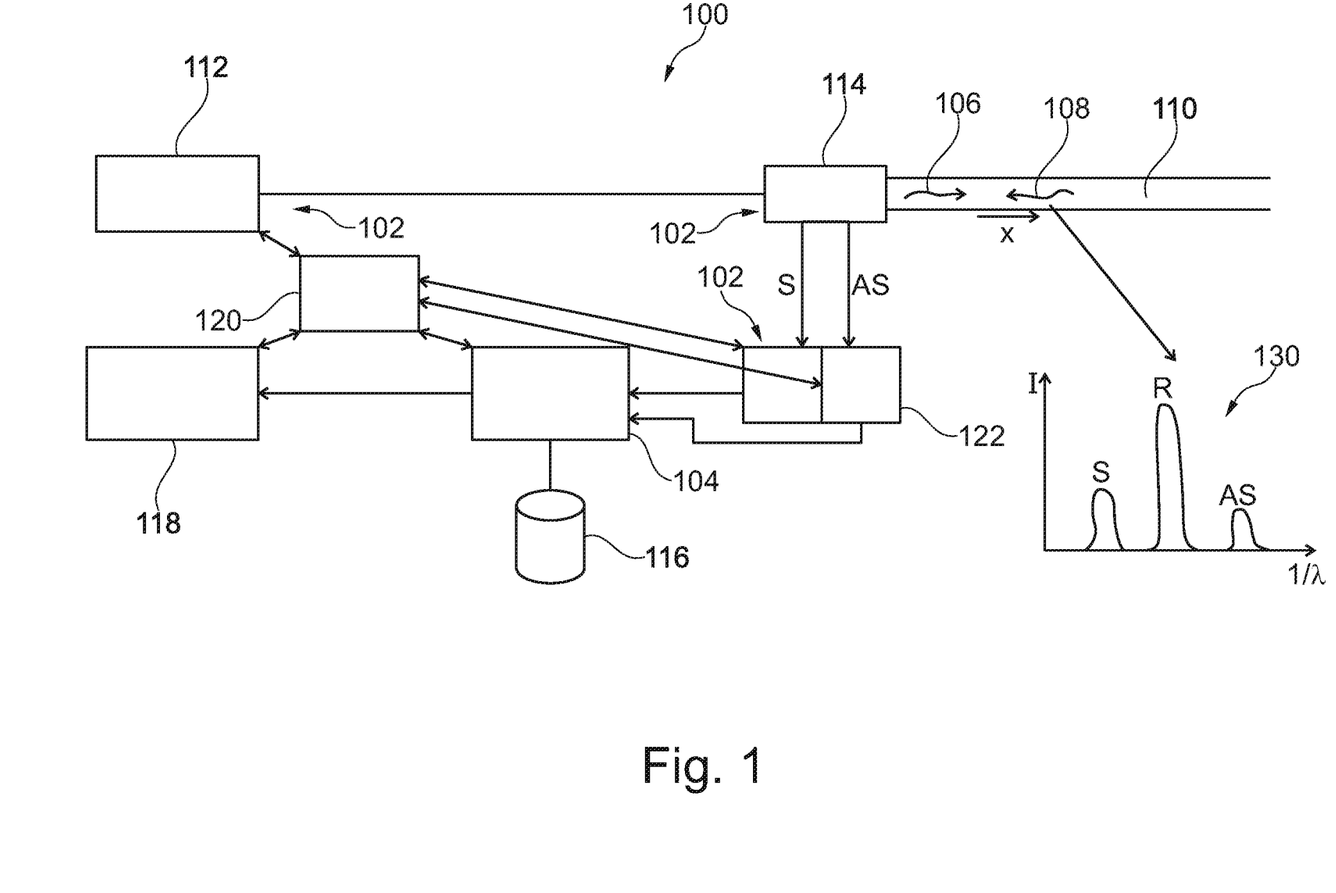
FIG. 1 illustrates a distributed sensing device according to exemplary embodiment of the invention.

FIG. 1 illustrates a distributed sensing device 100, configured as Distributed Temperature Sensing (DTS) device, according to an exemplary embodiment of the invention. The distributed sensing device 100 is configured for determining a distribution of a temperature, T, as physical quantity along a spatial extension, x, of a measurement fiber 110.

The device 100 comprises a measuring unit 102 configured for measuring a Stokes signal S and an Antistokes signal AS as known from Raman theory. S and AS are correlated to the temperature T. More specifically, the measuring unit 102 comprises an electromagnetic radiation source 112, such as a laser, to emit pulses of primary electromagnetic radiation 106, for instance in the near infrared wavelength range (for example with a wavelength between 850 nm and 1700 nm) and injects or couples them into the fiber 110 of the measuring unit 102. The primary electromagnetic radiation 106 then propagates along the fiber 110. Backscattered secondary electromagnetic radiation 108 leaving the fiber 110 is detected by an electromagnetic radiation detector 122, such as a photodetector, which also forms part of the measuring unit 102. In the embodiment of FIG. 1, the electromagnetic radiation detector 122 comprises a first detector unit for detecting the Stokes signal S and comprises a separate second detector unit for detecting the Antistokes signal AS. Furthermore, a beam splitter 114 is arranged with interfaces to the electromagnetic radiation source 112, the fiber 110 and both detector units of the electromagnetic radiation detector 122. The electromagnetic radiation detector 122 with its two detector units is configured for separating between different wavelength ranges within the secondary electromagnetic radiation 108, thereby being able to extract the Stokes signal S as a first measurement signal and the Antistokes signal AS as a second measurement signal. As can be taken from a diagram 130 plotting the detected intensity, I, in dependence of the reciprocal wavelength, $1/\lambda$, the detected data comprises a Rayleigh signal, R, resulting from elastic scattering, as well as the Stokes signal, S, and the Antistokes signal, AS, both resulting from inelastic scattering. The Stokes signal S and the Antistokes signal AS are used as a basis for further calculations, as described below.

A determining unit 104, which can be configured as a processor or a part thereof and which may have access to a database 116 for reading and/or writing data, is configured for later bringing the signals S, AS into a first relation used to determine the temperature value. The signals S, AS are supplied from the electromagnetic radiation detector 122 to the determination unit 104. The database 116, which may be embodied as a mass storage device such as a harddrive or an electronic memory such as a RAM or a flash memory, can be accessed by the determination unit 104, for instance to derive parameters of a model used for the determination of the physical quantity. The first relation between the signals S, AS can be a ratio. However, the determining unit 104 performs, prior to the determination of the temperature value based on the first relation, a correction of the signals S, AS based on another second relation between the signals S, AS. The second relation may relate to a normalized difference between the signals S, AS on the basis of a Raman model assuming a Planck distribution, to derive additional information in the signals S, AS lost by calculating the first relation. Calculating the ratio between the signals S, AS in accordance with the first relation alone does not allow to consider different noise levels of the signals S, AS. This lost information, which conventionally limits accuracy of the determined physical quantity, can be retrieved by analyzing the normalized difference between the signals S, AS in terms of the second relation. The different weights for the corrections (see $+N_S$ and $-N_{AS}$, respectively, in FIG. 4, or $RC(x)$, $RC_S(x)$, $RC_{AS}(x)$ in equations (11), (15), (16)) of the signals S, AS may be calculated depending on their respective signal-to-noise ratio. When one of the signals is exposed to a higher noise level than the other one of the signal, a corrective modification of first mentioned signal may be more pronounced than a corrective modification of the last mentioned signal t Thus, the determining unit 104 may perform the correction by assigning the different weights to the corrections of signals S, AS so that one of the signals S, AS having a larger signal-to-noise ratio than another one of these signals S, AS is corrected less than the other one of the signals S, AS. The determining unit 104 may be further configured for performing the correction based on a target value which may be empirically determined from the measured signals S, AS by applying the second relation and averaging the various values of the second relation over space, x, and/or over time, t, or as derived from a theory or a model.

The determining unit 104 may also selectively limit the correction to a specific section in space x (for instance excluding a spatial interface between two different fiber pieces of different materials attached to one another to thereby form the fiber 110) and/or in time t (for instance excluding a point of time at which the measurement conditions change, for instance due to a readjustment of the operation parameters of the electromagnetic radiation source 112), over which calculating/averaging would result in a reduction of the accuracy of the determined temperature value. The determining unit 104 may hence be restricted to a certain side of such a transition, for instance may be applied only on one spatial side of a spatial fiber interface or on one temporal side of an intensity change of the electromagnetic radiation.

The determining unit 104 then determines the temperature value by calculating the ratio between the corrected signals S and AS, i.e. taking into account information contained in the measured signals S, AS derived from both the first relation and the second relation. An input/output unit 118 is provided for outputting the result of the analysis to a user and also allows a user to input control commands into the distributed sensing device 100.

As can be taken from FIG. 1, the entire temperature determination procedure may be controlled by a control unit 120.

FIG. 2 shows four diagrams 200, 220, 240 and 260. In each of these diagrams 200, 220, 240 and 260, a respective abscissa 202 shows a position along fiber 110 on a linear scale. Along an ordinate 204 of the diagrams 200, 220, 240, 260, the respective signal is plotted on a logarithmic scale (i.e. in units dB).

Diagrams 200, 220 in a top row 210 relate to the scenario of a real and ideally measured hotspot at the fiber 110 (i.e. a high temperature value at a certain position of fiber 110). Diagrams 240, 260 in a bottom row 230 relate to the scenario of noise erroneously suggesting the presence of a hotspot or in other words a pure artifact (i.e. pure noise artificially indicating the presence of a hotspot at the fiber 110 which does actually not exist). In diagrams 200, 240 in a left column 250, a Stokes signal S (see reference numeral 206) and an Antistokes signal AS (see reference numeral 208) are plotted individually for the two above-mentioned scenarios. In diagrams 220, 260 in a right column 270 however, a ratio between the Stokes signal S and the Antistokes signal AS in plotted. FIG. 2 hence shows a correlation between a position x along the fiber 110 (on a linear scale) and a signal intensity of the two measurement signals S, AS (on a logarithmic scale (dB)).

In the shown example, two different example sets of Stokes signal S and Antistokes signal AS (the sets "real" according to the top row 210 and "not real" according to the bottom row 230) lead to identical ratio data (see diagrams 220, 260) and thus identical temperature results. In the dB space, the ratio operation transforms to a difference operation. In the "real" set according to the top row 210, both signals S and AS change in a correlated way as expected. In the "not real" set according to the bottom row 230 the change does not match (signal AS suggests a temperature increase, whereas signal S suggests a temperature decrease, i.e. the tendencies of the temperature indicated by signals S, AS are in contradiction), the ratio indicates an even higher temperature than each, S and AS, alone, and can be assumed as falsified by noise. Although it is difficult to say how much noise is in the Stokes signal S and in the Antistokes signal AS, by a statistical approach both signals S, AS can be corrected in a way that the noise in total (over whole trace and over time) improves significantly (see FIG. 5 and FIG. 6 described below).

Hence, calculating a logarithmic ratio of Stokes signal S and Antistokes signal AS only involves a loss of information. In the case of real temperature events or Raman events (see top row 210), the Stokes signal S and the Antistokes signal AS are correlated, i.e. a hotspot should increase both signals. However, noise may deteriorate or even destroy the correlation, but the ratio (thus derived temperature) may look the same (see bottom row 230), which is obviously not a pronounced real hotspot or coldspot.

Figure 3:
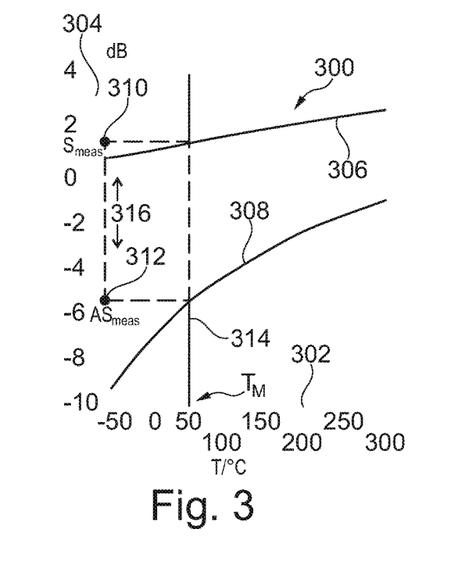
FIG. 3 illustrates a Raman strength over temperature under the assumption of noise-free Stokes and Antistokes signals.

FIG. 3 illustrates a Raman strength over temperature (at one trace location, i.e. at one spatial position along the fiber 110) under the assumption of noise-free Stokes and Antistokes signals S, AS according to the ideal Raman model. FIG. 3 shows a diagram 300 having an abscissa 302 along which the temperature is plotted on a linear scale. Along an ordinate 304, the Stokes signal S and the Antistokes signal AS are plotted on a logarithmic scale, i.e. in units dB.

Figure 4:
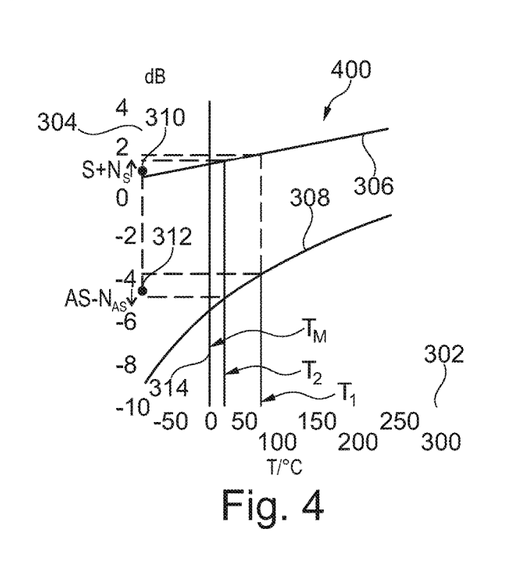
FIG. 4 illustrates a correction towards a model or target value (at one trace location) according to an exemplary embodiment of the invention in a scenario of noisy Stokes and Antistokes signals.

FIG. 4 illustrates a correction towards the Raman model (at one trace location) according to an exemplary embodiment of the invention in a scenario of noisy Stokes and Antistokes signals S, AS. FIG. 4 shows a diagram 400 which illustrates details of constructing the correction in the scenario of noisy Stokes and Antistokes signals S, AS.

Hence, a Raman correction principle according to an exemplary embodiment of the invention is illustrated. Since the correlation in (for instance perfect or ideal) Stokes and Antistokes signals S, AS is known, it can be used by the following procedure:
Pick out one location along the extension x of the sensor fiber 110

Ideal Stokes signal S and Anti-Stokes signal AS values lie on reference curves 306 (for Stokes signal S) and 308 (for Antistokes signal AS) shown in FIG. 3, depending only on the temperature for a given distributed sensing device 100 and fiber 110 (i.e. given laser power and instrument/fiber attenuations). Reference curve 306 relates to a Stokes model, whereas reference curve 308 relates to an Antistokes model.

Bullets 310, 312 in FIG. 3 show an example of a noise-free pair of Stokes signal S and Antistokes signal AS values. A matching temperature 314 ($T_M$=50° C.) matches measured values of the Stokes signal S, the Antistokes signal AS, and the ratio. It should be recalled that, in the logarithmic illustration along the ordinate 304 in FIG. 3 and FIG. 4, the ratio corresponds to a vertical distance or difference (see reference numeral 316).

FIG. 4 shows noisy data at $T=T_M$=50° C. Hence, no temperature value T matches the Stokes signal S and the Antistokes signal AS. $T_1$=112° C. matches the ratio, but requires a large shift of the Stokes signal S and the Antistokes signal AS, which is not physically plausible. Physically much more plausible is a small shift of the Stokes signal S and the Antistokes signal AS due to assumed noise N. A corresponding temperature $T_2$=62° C. is closer to reality. This corresponds to an upwards shift of the Stokes signal S ($S+N_S$) and a downwards shift of the Antistokes signal AS ($AS-N_{AS}$). For example, it can be assumed that $N=N_S=N_{AS}$.

It is unknown how much noise shifted the Stokes signal S and how much noise shifted the Antistokes signal AS. It may be assumed that both contribute according to their respective noisiness $N_S$ and $N_{AS}$ (depending on signal strength and measurement time). In a single receiver DTS, they are the same in dB space in good approximation, so that it is reasonable to assume $N_S=N_{AS}=N$.

Find the value N which when subtracted from S and added to AS allows to find a temperature where both points hit the respective curves.

Calculate the logarithmic ratio from these aligned or corrected values of the Stokes signal S and the Antistokes signal AS.

In the following, a mathematical description of Raman alignment according to an exemplary embodiment of the invention will be presented. The scenario according to FIG. 4 is hence described in the following in terms of Raman theory (see for instance Ch. Kittel, "Einführung in die Festkörperphysik", 14$^{th}$ edition, Oldenburg Verlag, page 485):

$$AS_{lin}=\chi_{AS}/(e^{(\hbar\Omega/k_BT)}-1) \quad (5a)$$

$$S_{lin}=\chi_S(1+1/(e^{(\hbar\Omega/k_BT)}-1)) \quad (5b)$$

wherein:

$$\chi_{AS}=P_{LD}AS_0 \quad (5c)$$

$$\chi_S=P_{LD}S_0 \quad (5d)$$

and wherein $P_{LD}$ the laser pulse power, i.e. the power of the electromagnetic radiation source 112. $S_0$ and $AS_0$ are respective sensitivity factors at respective wavelengths (considering wavelength, attenuations, Raman cross section, fiber capture cross section, detector sensitivity, etc.).

Two unknown values $\chi_{AS}$ and $\chi_S$ reduce to one Raman scaling factor $\chi$ by using data from a fiber section of known temperature (reference coil) and fiber correction.

$$AS_{lin} = \chi/(e^{T_0/T}-1) \quad (6a)$$

$$S_{lin} = \chi(1+1/(e^{T_0/T}-1)) \quad (6b)$$

wherein $T_0 = \hbar\Omega/k_B$ (about 500 K in silica fiber).

A conventional Distributed Temperature Sensing device uses only a ratio $R_{lin}$ (leading to information loss), where $\chi$ cancels out:

$$R_{lin} = AS_{lin}/S_{lin} = e^{-T_0/T} \quad (7a)$$

Resolving to:

$$T = T_0/\ln(R_{lin}) \quad (7b)$$

As known by those skilled in the art, the temperature T as calculated according to equation (7b) can be further corrected by considering a correction factor derived from a reference fiber section of known temperature, the correction factor being multiplied to $R_{lin}$.

In contrast to this, a Distributed Temperature Sensing device according to an exemplary embodiment of the invention preserves this conventionally lost information. The linear difference S-AS is constant of temperature in theory (but may still vary over space and may be interpreted as loss trace).

$$S_{lin} - AS_{lin} = \chi \quad (8)$$

Noise makes a measured scaling factor $\chi_{meas}$ deviate from an ideal scaling factor $\chi_{ideal}$. This difference bears additional information, proofing that there is noise. With known $\chi_{ideal}$ it is possible to correct $S_{lin}$ and $AS_{lin}$ in a statistically improved way.

In this context, a task may be to find a good estimate of $\chi_{ideal}$, then align measured Stokes signal S and Antistokes signal AS in a suitable way to match this value.

One noisy measurement at one fiber point gives a noisy $\chi_{meas}$ for that location and time. Hence, it may be advantageous to estimate $\chi_{ideal}$, e.g.:

- by a separate calibration measurement (for instance with very long measurement time or over many traces) and/or
- by determining it live by the DTS device as average over neighbor points (spatial referencing) and/or over trace points over time (temporal referencing).

In the following, a Raman alignment formula for spatial referencing will be described. Corresponding inputs are:

$S_{lin}(x)$ and $AS_{lin}(x)$: Traces in linear units over points x

NR: $AS_{lin}$ to $S_{lin}$ noise ratio in linear units; depends e.g. on number of pulse repetitions, detector sensitivity at respective wavelength and/or shot-noise; it may be 0.2 and may turn out to be nearly constant over distance LCR=$T_0$ 10 log e≠2180 K (Linear Coupling Ratio)

RNGx: Spatial referencing averaging range, for instance ±8 times the device's spatial resolution Calculate the Raman scaling factor $\chi$ from equation (8) and average it over space:

$$\chi(x) = S_{lin}(x) - AS_{lin}(x) \quad (9)$$

$$\chi_{avg}(x) = avg_{\{k=x-RNGx \ldots x+RNGx\}}\{\chi(k)\} \quad (10)$$

Alternatively, averaging may be carried out with measuring points with different weights.

Derive Raman Correction RC:

$$RC(x) = S_{lin}(x) - AS_{lin}(x) - \chi_{avg}(x) \quad (11)$$

and split into a Stokes signal S part and an Antistokes signal AS part with different weights (i.e. what follows after RC(x) in equations (12) and (13)) in a statistically optimum way:

$$RC_S(x) = RC(x)/(1+NR^2) \quad (12)$$

$$RC_{AS}(x) = RC(x)NR^2/(1+NR^2) \quad (13)$$

with $$RC_S(x) + RC_{AS}(x) = RC(x) \quad (14)$$

Calculate Corrected Raman:

$$S_{lin}^{aligned}(x) = S_{lin} - RC_S(x) \quad (15)$$

$$AS_{lin}^{aligned}(x) = AS_{lin}(x)RC_{AS}(x) \quad (16)$$

Under certain circumstances, it is possible that alignment of the Antistokes signal AS is omitted with very little noise degradation.

Finally, it is possible to use these aligned traces for temperature calculation, as done conventionally (i.e. from first relation).

Next, a Raman alignment formula will be described implementing temporal referencing.

The Raman scaling factor $\chi$ is averaged over time rather than over space, so equation (10) is replaced for instance by:

$$\chi_{avg}(x,t) = avg_{\{t'=t-RNGt \ldots t\}}\{\Psi(x,t')\} \quad (17)$$

Averaging may be carried out with different weights for different times, especially with exponential averaging, thus less memory demand:

$$\chi_{avg}(x,0) = \chi(x,0) \quad (18)$$

$$\chi_{avg}(x,t) = w^*\chi_{avg}(x,t-1) + (1-w)^*\chi(x,t) \quad (19)$$

or mixing of both (first linear averaging, than switch to exponential averaging).

In equations (17) to (19), x denotes a sample point, t denotes a time index (trace number), RNGt refers to a temporal referencing average range, and w denotes an exponential averaging weight factor (0: no averaging; approaching 1: eternal or maximum averaging), for instance 0.889 for equivalent of averaging over 17 traces. One consequence of averaging over time may be that the final noise in the measurement result decreases from trace to trace as long as the number of averages increases.

Figure 5:
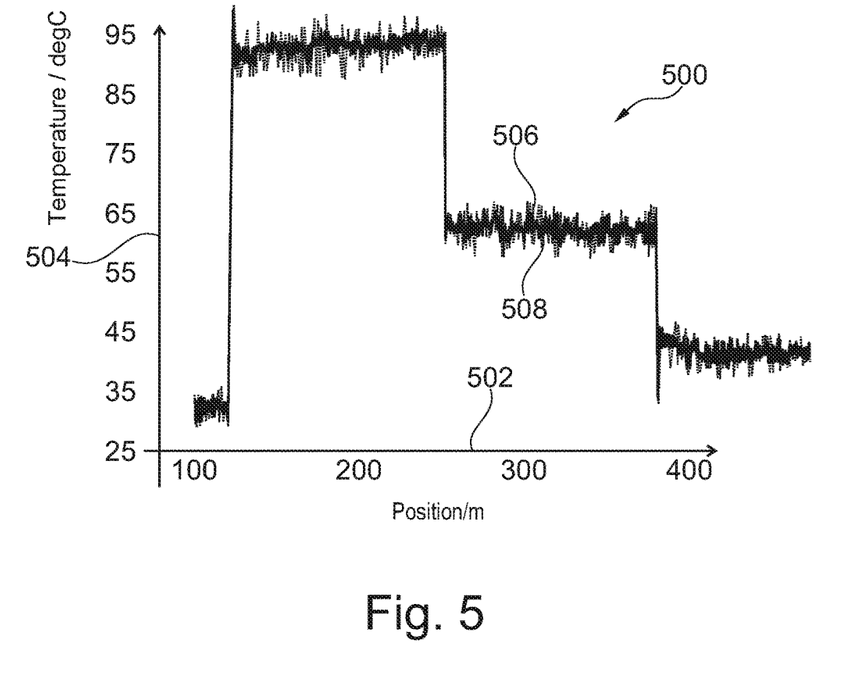
FIG. 5 and FIG. 6 illustrate, on two different scales, an improvement of accuracy of the temperature determining procedure according to an exemplary embodiment of the invention.
Figure 6:
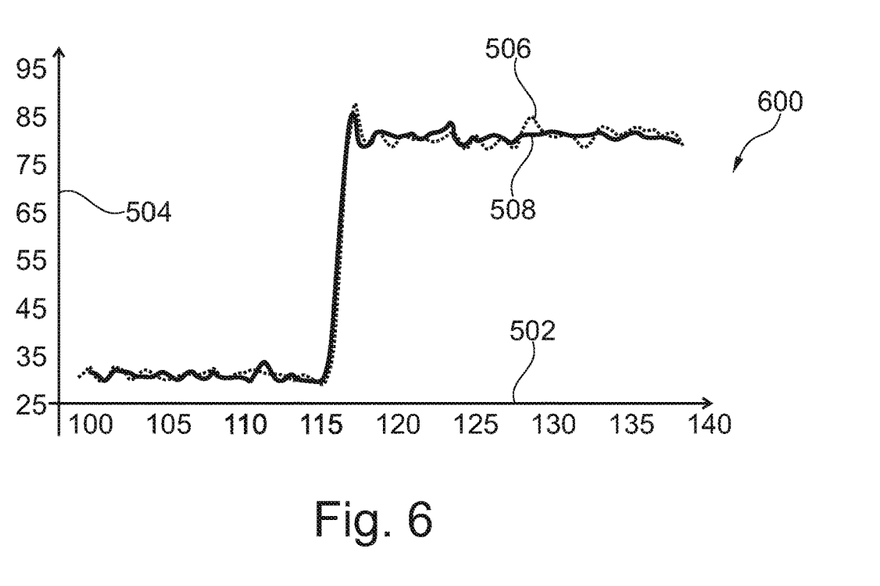

FIG. 5 and FIG. 6 illustrate, on two different scales, an improvement of accuracy of the temperature determining procedure according to an exemplary embodiment of the invention. FIG. 5 shows a diagram 500 having an abscissa 502 along which a position along fiber 110 is plotted, whereas a determined temperature as physical quantity is plotted along an ordinate 504. A first curve 506 shows a conventional result of the estimation of the temperature distribution along the fiber 110, only considering a ratio of Stokes signal S and Antistokes signal AS. This can be compared with another temperature curve 508 related to a determination method according to an exemplary embodiment of the invention considering not only the ratio between Stokes signal S and Antistokes signal AS, but additionally considering a weighted difference between Stokes signal S and Antistokes signal AS. It can be taken from FIG. 5 that the accuracy of the temperature determination according to the shown exemplary embodiment of the invention (curve 508) is more precise than the conventional determination (see curve 506). FIG. 6 shows a diagram 600 including the same information as the diagram 500 however with a refined scale.

Figure 7:
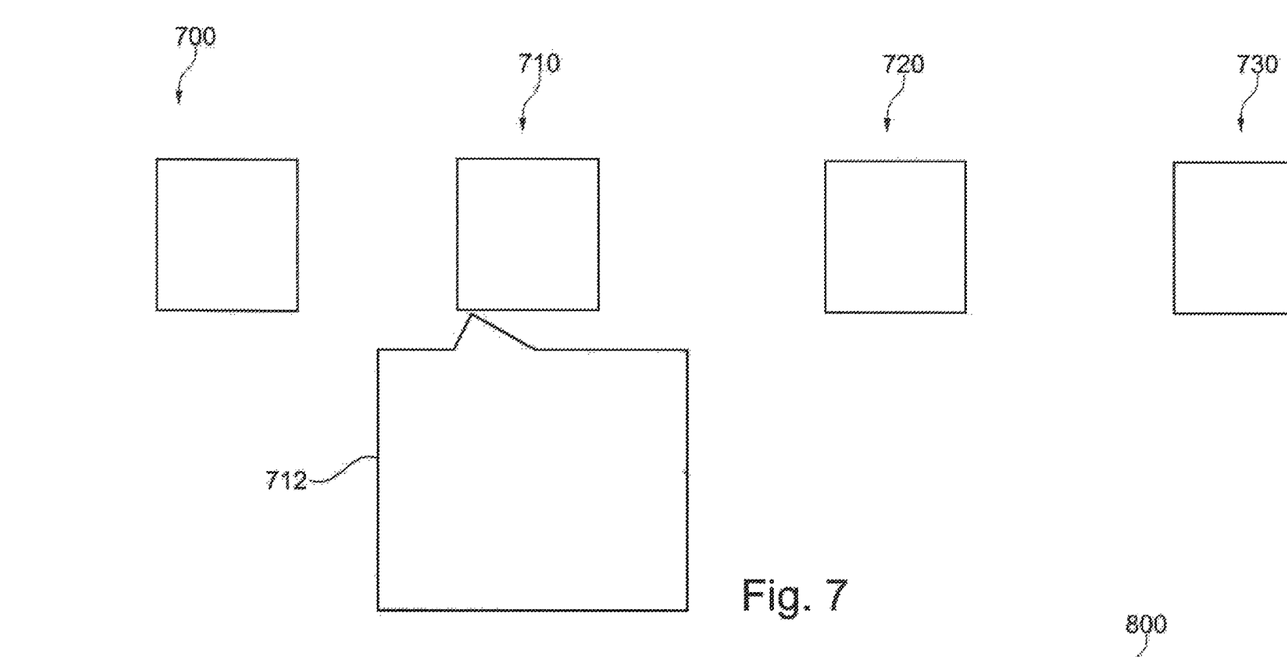
FIG. 7 illustrates a numeric example of correcting a Stokes signal and an Antistokes signal for determining a temperature with increased precision according to an exemplary embodiment of the invention.

FIG. 7 illustrates an example of correcting a Stokes signal S and an Antistokes signal AS for determining a temperature with increased precision according to an exemplary embodiment of the invention.

A first column 700 of the table shown in FIG. 7 indicates the various parameters involved in the measuring, correction and determining procedure as follows:
Watch one point along fiber:
S signal (normalized)
AS signal (normalized)
first relation (ratio-->temperature)
second relation
(normalized difference, χ, eq.4).

A second column 710 indicates the unknown real values of the Stokes signal S and the Antistokes signal AS (i.e. without distortions such as noise) as follows: Real values (unknown)
  1,1 unknown
  0,1 unknown
  0,091 unknown
  Real (noise-free) value (usually < >1,1
  changing along fiber), unknown.
The ratio between the true undistorted signals S and AS, based on which the temperature can be calculated, is indicated in the second column 710 as well. Furthermore, the ideal or target value of the second relation for the true undistorted signals S and AS is indicated as well. The target value (which assumes the value "1" in the shown example) can be predetermined as indicated in a bubble 712 and can be used as a basis for the signal correction described in the following in further detail, wherein the bubble 712 indicates: Real 2nd relation can be more or less accurately derived from Theory or Model or (empirically) estimated from avg. of measured 2nd rel. over neighbor points or former measurements. It becomes our "target" relation for correction. May have rest noise (but here assumed example 1.00).

A third column 720 indicates the known, measured values of the Stokes signal S and the Antistokes signal AS, i.e. with (unknown) distortions such as noise: Measured (noisy)
  1,22 measured
  0,09 measured
  0,074 convent, result, bad due to noise
  1,13 2nd relat. reveals misfit to target.
As can be taken from the third column 720, both the first relation and the second relation deviate from the corresponding values in the second column 710 due to the distortions.

A fourth column 730 shows a correction performed according to an exemplary embodiment of the invention as follows: Corrected (change 2nd. relation by −0.13)
  1,099 reduced by 0.121 (~−10%)
  0,099 increased by 0.009 (~+10%)
  0,090 much closer to real value
  2nd relation corrected towards target 1,00 relation.
As compared to the measured values of the Stokes signal S and the Antistokes signal AS according to the third column 720, the Stokes signal S and the Antistokes signal AS according to the fourth column 730 are shifted (in the shown example both by 10% in opposite directions) so that the second relation calculated for the shifted signals S, AS is equal to the target value ("1" in the shown embodiment) indicated in the second column 710. The shifted or corrected signals S, AS can then be used for calculating the first relation. As can be taken from a comparison of the value of the first relation in columns 710, 720, 730, the temperature derived for the corrected signals S, AS (from the ratio) is significantly closer to the true temperature than the temperature determined based on the uncorrected signals S, AS (from the ratio).

Figure 8:
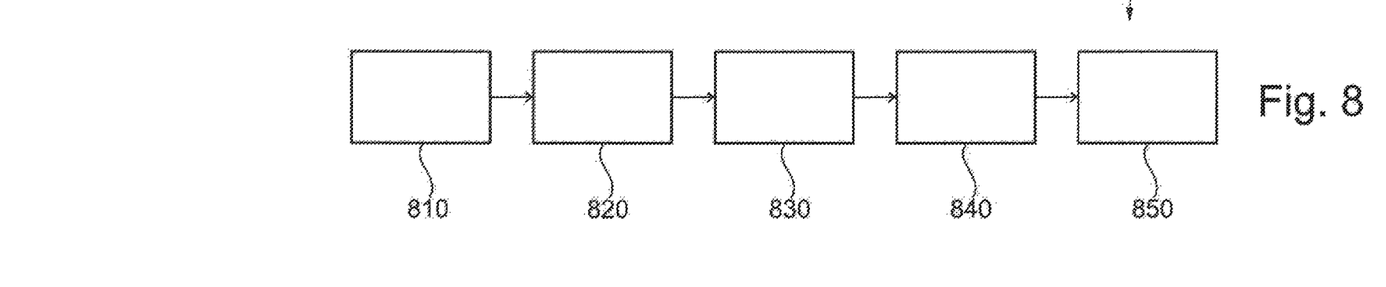
FIG. 8 illustrates a block diagram of a method of determining a physical quantity by distributed temperature sensing according to an exemplary embodiment of the invention.

FIG. 8 illustrates a block diagram 800 of a method of determining a physical quantity by distributed temperature sensing according to an exemplary embodiment of the invention. This method is based on a correction of a Stokes signal and an Antistokes signal for reducing signal distortions (for instance noise distortions) thereof to thereby, in turn, determine a temperature with improved accuracy. During executing this method, a first relation (for actually calculating the temperature) and a second relation (for improving accuracy of the calculated temperature by improving signal quality) between Stokes signal and Antistokes signals are considered.

As can be taken from a block 810, the Stokes signal S and the Antistokes signal AS are measured. Both S and AS comprise distortions such as noise.

As can be taken from a block 820, an actual value of the second relation between the Stokes signal S and the Antistokes signal AS is calculated, whereas the second relation is a normalized difference between S and AS. This calculation can be carried out at one or at multiple spatial points along the fiber.

As can be taken from a block 830, a target value of the second relation is calculated, wherein this target value is the value of the second relation between S and AS under the assumption of undistorted (in particular noise-free) signals S, AS. For instance, the target value may be calculated by calculating an average value of multiple values of the second relation measured at different positions in space. Additionally or alternatively, the target value may be calculated by calculating an average value of multiple values of the second relation measured at different points of time. Further alternatively, the target value may be determined based on a model or empirical data.

As can be taken from a block 840, the distorted signals S and AS, as measured, are corrected so that the value of the second relation of the corrected signals S, AS equals to the target value (or is at least closer to the target value than before the correction).

As can be taken from a block 850, the temperature (and/or any other physical quantity of interest, for instance strain) is calculated on the basis of the first relation between the corrected Stokes signal S and the corrected Antistokes signal (i.e. as output by block 840). For instance, the first relation may be the ratio between the corrected Stokes signal S and the corrected Antistokes signal AS.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A distributed sensing device for determining a physical quantity, the device comprising:
  a measuring means configured for measuring at least two signals correlated to the physical quantity by distributed sensing;
  a determining means configured for:
    bringing the at least two signals into a first relation used to determine the physical quantity;
    performing a correction based on a second relation between the at least two signals, wherein the second relation is a normalized difference between the at least two signals;
    determining the physical quantity based on the first relation by taking the correction into account.

2. The device according to claim 1, wherein the at least two signals comprise a Stokes signal and an Antistokes signal measured by the measuring means as secondary electromagnetic radiation generated in a fiber of the distributed sensing device in response to coupling primary electromagnetic radiation into the fiber by an electromagnetic radiation source.

3. The device according to claim 1, wherein the first relation relates to a ratio between the at least two signals.

4. The device according to any of claim 1, wherein the second relation is indicative of a deviation of the at least two signals from a predetermined target value.

5. The device according to claim 1, wherein the determining means is configured for performing the correction by, in particular individually, correcting the at least two signals so that an absolute value of a difference between a predetermined target value and the second relation calculated for the measured signals is larger than an absolute value of the difference between the predetermined target value and the second relation calculated for the corrected signals, in particular so that the second relation calculated for the corrected signals is equal to the predetermined target value.

6. The device according to claim 1, wherein the physical quantity is a temperature and/or a strain of, in particular a temperature distribution and/or a strain distribution along, a fiber of the distributed sensing device.

7. The device according to claim 1, wherein the determining means is configured for performing the correction by correcting at least one of the group consisting of at least one of the at least two signals, the physical quantity to be determined, and an intermediate quantity determined in a determination chain of determining the physical quantity based on the at least two signals.

8. The device according to claim 1, wherein the determining means is configured for performing the correction, in particular for determining a target value which is in accordance with the second relation when having performed the correction, based on a predefined model.

9. The device according to claim 8, wherein the predefined model is one model of the group consisting of a Raman scattering model assuming a Planck distribution, a user-modified Raman scattering model, a Brillouin scattering model, a user-modified Brillouin model, and an empirical model.

10. The device according to claim 1, wherein the determining means is configured for performing the correction with different weights for the at least two signals, in particular depending on their respective noise levels or signal-to-noise ratios.

11. The device according to claim 10, wherein the determining means is configured for performing the correction by assigning the different weights to the at least two signals so that one of the signals having a lower noise or a larger signal-to-noise ratio than another one of these signals is corrected less than the other one of the signals.

12. The device according to claim 10, wherein the assigned weights are independent of the physical quantity to be determined.

13. The device according to claim 1, wherein the determining means is configured for determining a target value, which is in accordance with the second relation when having performed the correction, by averaging, over space, values derived from the second relation applied to the at least two signals.

14. The device according to claim 1, wherein the determining means is configured for determining a target value, which is in accordance with the second relation when having performed the correction, by averaging, over time, values derived from the second relation applied to the at least two signals.

15. The device according to claim 13, wherein the determining means is configured for selectively limiting the averaging to at least one section, in particular to at least one section in space and/or in time, in which a condition influencing the second relation is free of significant changes, in particular discontinuities.

16. The device according to claim 1, wherein the at least two signals are correlated to one another.

17. The device according to claim 1, wherein the determining means is configured for performing the correction by shifting the at least two signals relative to one another, in particularly so that a match of the shifted at least two signals with regard to a model is improved compared to a match of the at least two signals with regard to the model without the shifting.

18. The device according to claim 1, wherein the determining means is configured for performing the correction by correcting the at least two signals for each respective corresponding spatial position along a fiber individually.

19. The device according to claim 1, wherein the determining means is configured for:
 determining a first preliminary physical quantity based on only one of the at least two signals;
 determining a second preliminary physical quantity based on only another one of the at least two signals;
 performing the correction by applying the second relation to the first preliminary physical quantity and the second preliminary physical quantity;
 determining the physical quantity by applying the first relation to the first preliminary physical quantity and the second preliminary physical quantity by taking the correction into account.

20. The device according to claim 1, configured as one of the group consisting of a Distributed Temperature Sensing device, and a Distributed Temperature and Strain Sensing device.

21. A method of determining a physical quantity by distributed sensing, the method comprising:
 measuring at least two signals correlated to the physical quantity by distributed sensing;
 bringing the at least two signals into a first relation used to determine the physical quantity;
 performing a correction based on a second relation between the at least two signals, wherein the second relation is a normalized difference between the at least two signals;
 determining the physical quantity based on the first relation by taking the correction into account.

22. A computer-readable medium, in which a computer program of determining a physical quantity by distributed sensing is stored, which computer program, when being executed by a processor, is adapted to carry out or control a method of:
 measuring at least two signals correlated to the physical quantity by distributed sensing;
 bringing the at least two signals into a first relation used to determine the physical quantity;
 performing a correction based on a second relation between the at least two signals, wherein the second relation is a normalized difference between the at least two signals;
 determining the physical quantity based on the first relation by taking the correction into account.

23. A program element of determining a physical quantity by distributed sensing, which program element, when being executed by a processor, is adapted to carry out or control a method of:

measuring at least two signals correlated to the physical quantity by distributed sensing;

bringing the at least two signals into a first relation used to determine the physical quantity;

performing a correction based on a second relation between the at least two signals, wherein the second relation is a normalized difference between the at least two signals;

determining the physical quantity based on the first relation by taking the correction into account.

* * * * *